(12) United States Patent
Wixey

(10) Patent No.: US 7,207,121 B2
(45) Date of Patent: Apr. 24, 2007

(54) DIGITAL MEASUREMENT SYSTEM

(76) Inventor: Barry Wixey, 5306 Umbrella Pool Rd., Sanibel, FL (US) 33957

( * ) Notice: Subject to any disclaimer, the term of this patent is extended or adjusted under 35 U.S.C. 154(b) by 31 days.

(21) Appl. No.: 10/839,370

(22) Filed: May 4, 2004

(65) Prior Publication Data

US 2005/0005468 A1    Jan. 13, 2005

Related U.S. Application Data

(60) Provisional application No. 60/467,326, filed on May 5, 2003, provisional application No. 60/492,111, filed on Aug. 4, 2003.

(51) Int. Cl.
*G01D 21/00* (2006.01)
(52) U.S. Cl. .......................................... 33/613; 33/626
(58) Field of Classification Search .................. 33/626, 33/628, 641, 784, 832–834, 613
See application file for complete search history.

(56) References Cited

U.S. PATENT DOCUMENTS

| 4,908,953 | A | * | 3/1990 | Wallisser ...................... 33/701 |
| 4,945,651 | A | * | 8/1990 | Georg .......................... 33/832 |
| 5,036,596 | A | * | 8/1991 | Gyoury et al. ................. 33/636 |
| 5,365,667 | A | * | 11/1994 | Golding ........................ 33/201 |
| 5,404,317 | A | * | 4/1995 | Song et al. .................. 702/198 |
| 6,095,728 | A | * | 8/2000 | Howie .......................... 33/638 |
| 6,263,585 | B1 | * | 7/2001 | Dickinson et al. ............ 33/836 |
| 6,314,657 | B2 | * | 11/2001 | Kroll et al. ................... 33/783 |
| 6,796,050 | B2 | * | 9/2004 | Haimer et al. ................ 33/636 |
| 6,915,591 | B2 | * | 7/2005 | Hayashida et al. ........... 33/815 |

* cited by examiner

*Primary Examiner*—Yaritza Guadalupe-McCall
(74) *Attorney, Agent, or Firm*—William E. Nooan

(57) ABSTRACT

A digital measurement system is provided for an apparatus including first and second parts that are positionally adjustable relative to one another, the first part having a base surface and the second part being selectively adjustable toward and away from the base surface. The measurement system includes an elongate reference element mounted for longitudinal movement on the first part such that a first end of the reference element is positionable to be substantially even with the base surface of the first part. A digital reader head is attachable to the second part. The reader head is operable is operably engaged with and moveable along the reference element for measuring relative movement of the reader head along the reference element. The readout further includes a digital display for indicating a measurement corresponding to the relative movement of the reader head along the reference element.

17 Claims, 16 Drawing Sheets

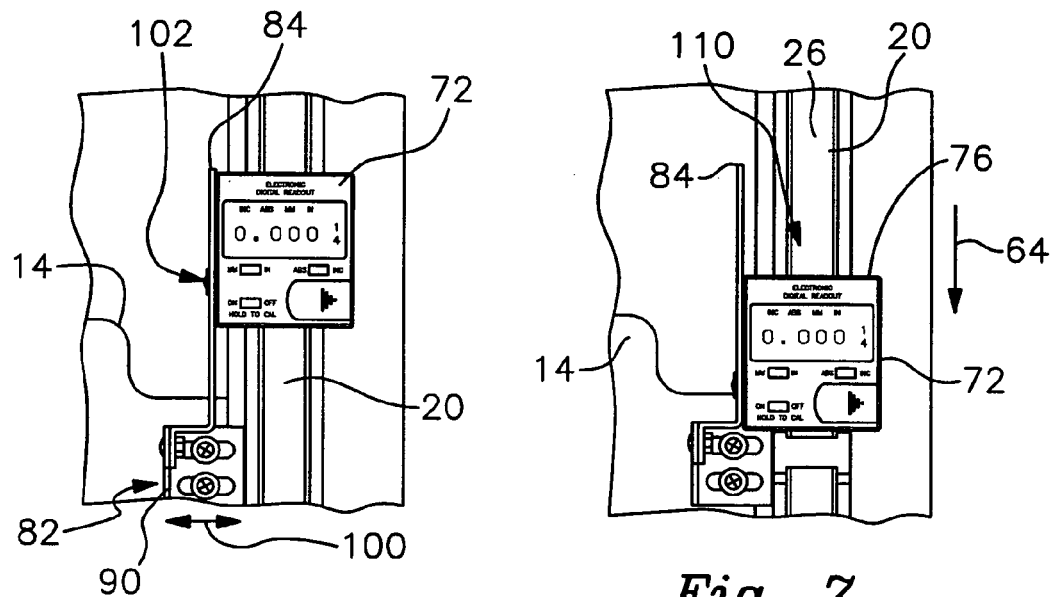
Fig. 6
Fig. 7
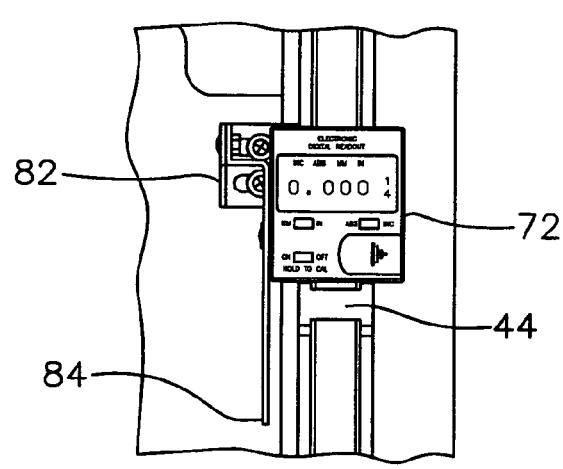
Fig. 8

| ACTUAL MEASUREMENT | DECIMAL DISPLAYED | FRACTION DISPLAYED |
|---|---|---|
| 1.022 | 1.020 | |
| 1.023 | 1.025 | |
| 1.024 | 1.025 | |
| 1.025 | 1.025 | |
| 1.026 | 1.025 | |
| 1.027 | 1.025 | |
| 1.028 | 1.030 | |
| 1.029 | 1.030 | 1/32 |
| 1.030 | 1.030 | 1/32 |
| 1.031 | 1.030 | 1/32 |
| 1.032 | 1.030 | 1/32 |
| 1.033 | 1.035 | 1/32 |
| 1.034 | 1.035 | |
| 1.035 | 1.035 | |
| 1.036 | 1.035 | |
| 1.037 | 1.035 | |

Fig. 31

DIGITAL MEASUREMENT SYSTEM

RELATED APPLICATION

This application claims the benefit of U.S. Provisional Application Ser. Nos. 60/467,326, filed May 5, 2003, and 60/492,111, filed Aug. 4, 2003.

FIELD OF THE INVENTION

This invention relates to a digital measurement system and more particularly to a system for providing accurately calibrated digital measurements in woodworking machines and other types of machinery tools and applications.

BACKGROUND OF THE INVENTION

Woodworking machines, such as planers and sanders, as well as various other dimensionally adjustable tools employ digital readouts that measure the height, length or thickness of the piece on which the tool is working. Properly calibrating the readout device tends to be problematic. For example, in planers and sanders, the readout is typically mounted to a height-adjustable cutting head. In order to avoid damage to the cutting blades, this head is normally not allowed to engage the wood-supporting table of the machine. As a result, it is virtually impossible to properly calibrate the machine by simply adjusting the height of the head alone. A representative or previously planed board first must be accurately measured using calipers or a similar instrument. This measurement must then be physically entered into the readout, which calibrates the instrument. This procedure requires extra, independent measurements and is tedious, time-consuming and subject to caliper misreadings and, as a result, inaccurate calibration results. Moreover, readouts capable of such data entry are fairly complex and expensive instruments.

Conventional digital readouts exhibit additional shortcomings. Many users prefer for the measured readings to appear in a fractional format on the readout. However, decimally-based readout devices typically have a much higher resolution than fractionally-based readouts. Decimal displays normally have a resolution of one-thousandth inch or less. Fractional displays, however, normally exhibit fractions no smaller than one-sixty fourth inch (i.e. 0.015625 inch). This is more than fifteen times greater than the resolution that the typical readout is capable of producing. As a result, the user is unable to obtain the most accurate measurements possible.

The lack of resolution in conventional digital measuring systems is compounded because the fractional dimensions are typically programmed to initially appear on the display at the midpoint of the closest decimal equivalent and the decimal that is equivalent to the immediately preceding fraction. For example, in a fractional readout display, the fraction one-sixteenth (1/16) (having a decimal equivalent of 0.063) is normally programmed to appear on the readout display at an actual dimension of 0.047, which is the mid-point between 0.031 (the visually appear on the display at measured values significantly below and above the decimal equivalents. This can result in measurements that are imprecise and unsatisfactory. Moreover, conventional digital readouts do not provide an accurate and reliable, yet east to read and understand correlation between corresponding decimal and fractional equivalents. The clarity and accuracy of such digital measuring systems needs to be significantly improved, especially for persons desiring to employ a fractional display.

SUMMARY OF THE INVENTION

It is therefore an object of the present invention to provide a digital measurement system that enables highly accurate, calibrated measurements to be taken and displayed conveniently in a wide variety of machines, tools and other applications.

It is the further object of this invention to provide a digital measurement system, which is extremely quick and easy to calibrate and which is far less tedious and time consuming, and much more efficient to calibrate than conventional digital measurement devices.

It is the further object of this invention to provide a digital measurement system that is particularly convenient for use in woodworking machines such as height-adjustable planers and sanders, and which enables such machines to be quickly and conveniently calibrated without first having to measure a standard board with calibers.

It is the further object of this invention to provide a measurement system employing an easy-to-read digital display featuring both decimal and fractional measurements.

It is the further object of this invention to provide a digital readout wherein fractional equivalents are displayed much more clearly and understandably than in conventional systems.

It is the further object of this invention to provide a digital readout with a fractional measurement display that is much more accurate than conventional fractional displays.

It is the further object of the present invention to provide a calibrated digital measuring system that maintains proper calibration over numerous uses and even after the readout has been turned off and on repeatedly.

This invention results from the realization that an electronic digital readout of the type utilized with woodworking machines and similar tools can be calibrated much more easily and efficiently by mounting the readout slidably on a reference scale that is itself mounted to be longitudinally adjustable on the machine. A calibrating reference board simply is placed between a lower end of the reference scale and a supporting table of the machine. The readout may then be quickly and accurately calibrated so that consistent, accurate measurements are thereafter obtained by the readout on the machine.

This invention results from the further realization that an improved digital readout display, in a fractional format, may be provided by displaying measurements in fractional equivalents within periodic predetermined decimal ranges, which are substantially less than the resolution of the fractional display.

This invention features a digital measurement system for an apparatus including first and second parts that are positionally adjustable relative to one another. The first part has a base surface and the second part is selectively adjustable toward and away from the base surface. The measurement system includes an elongate reference element mounted for longitudinal movement on the first part such that a first end of the reference element is positionable to be substantially even with the base surface of the first part. A digital readout device includes a digital reader head attachable to the second part. The reader head is operably interengaged with and moveable along the reference element for measuring relative movement of the reader head along the reference element. The readout further includes a digital display for indicating a measurement corresponding to the relative movement of the reader head along the reference element.

In a preferred embodiment, the reference element includes a linear scale. The reference element may include a strip that operably cooperates with the reader head using electrical, mechanical or optical means. The reference element may be longitudinally slidably moveable within a bracket that is attached to the first part. The bracket may include a stop for engaging the first end of the reference element, and limiting movement of the reference element through the bracket in a first direction. The stop may be locatable substantially even with the base surface. The first end of the reference element may include a convex end of the reference element may carry a tab for pulling the reference element longitudinally through the bracket such that the first end is spaced apart from the stop. A board or other reference component of unknown thickness is received between the stop and the first end of the reference element such that the reference component can be measured by the system. A spring may be connected between the bracket and the reference element for urging the reference element through the bracket such that the lower end of the reference element engages the stop. The spring also allows the reference element to move in an opposite direction through the bracket to disengage the first end of the flexible element from the stop.

The reader head may include means for calibrating the reader head at a selected reference position along the reference element. The reference position is typically the position the reader head maintains with the reference board between the first end of the reference element and the stop. The readout may include an absolute mode wherein the distance the reader head is positioned on the reference element from the selected reference position is determined by the reader head and indicated by the display. The readout may include an incremental mode wherein the reader and display are reset to a "zero" value with the reader at a selected reference position on the reference element, and wherein subsequent movement of the reader relative to the reference element is measured by the reader, which measurement is indicated by the display. The readout may include display modes that indicate the measured relative movement in decimal and fractional units of measurement.

This invention also features a digital measurement system including a digital reader head that is operably engagable with a reference element for determining measurements or relative movement between the reader head and the reference element according to a predetermined decimal resolution. There are means for displaying corresponding decimal measurements according to a predetermined decimal display resolution. There are also means for converting the measurements within discrete predetermined decimal ranges to corresponding fractional measurements and displaying the corresponding fractional measurements according to a predetermined fractional display resolution. Such corresponding fractional measurements are displayed adjacent to the corresponding decimal measurements. The discrete, predetermined decimal range is smaller than the predetermined fractional display resolution.

Preferably, the system includes an LCD display wherein the fractional measurements are displayed adjacent to the corresponding decimal measurements. The decimal reference resolution is preferably 0.001 or less and the fractional display resolution is preferably at least 1/32 and not greater than 1/64. The decimal display resolution may be about 0.005.

DETAILED DESCRIPTION OF PREFERRED EMBODIMENTS

Other objects, features and advantages will occur from the following description of preferred embodiments and the accompanying drawings, in which:

FIGS. 6 and 7 are perspective views depicting installation of the digital readout;

FIG. 8 is a perspective view illustrating an alternative installation arrangement for the digital readout;

FIG. 30 is a graphic view of a preferred display format of the measurement system, featuring equivalent decimal and fractional displays;

FIG. 31 is a graphic view of an alternative readout format including equivalent decimal and fractional displays.

Figure 1:
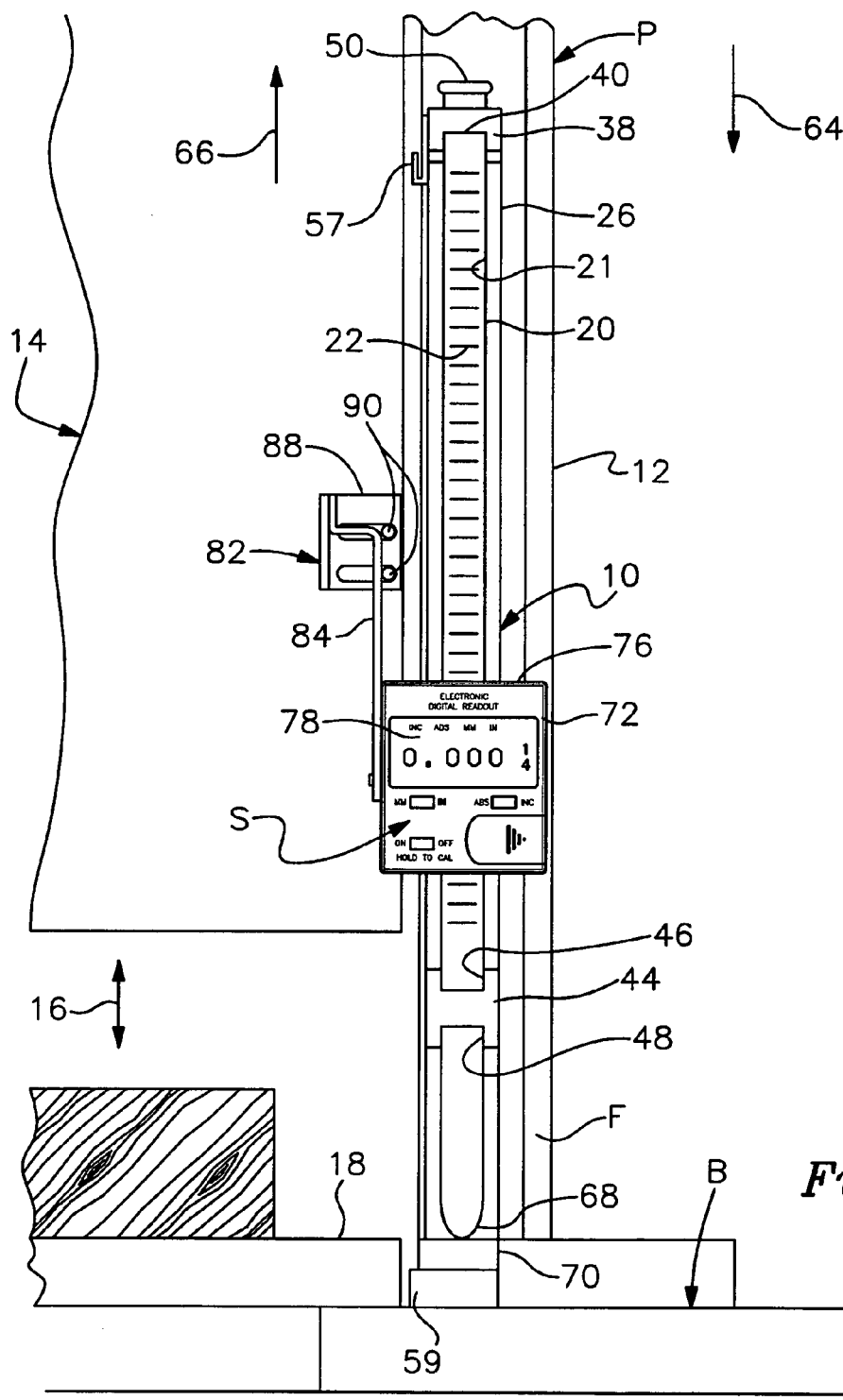
FIG. 1 is a front elevational view of a representative woodworking machine, namely a planer, employing the digital measurement system of this invention.

There is shown in FIG. 1 a woodworking machine, namely a planer P that incorporates a digital measurement system 10 in accordance with this invention. The measurement system may be employed equally effectively with various other types of woodworking machines such as wide belt sanders. It also may be utilized in various other types of machines, tools and other applications wherein heights, depths, thicknesses, lengths, widths and other dimensional measurements are required. The particular environment in which system 10 is employed is not a limitation of this invention.

Planer P includes a pair of parts that are adjustable up and down relative to one another. These particularly include a relatively fixed housing or casing 12 and a cutting head 14 that is moveable upwardly and downwardly within casing 12 as indicated by double-headed arrow 16. More particularly, the cutting head includes conventional cutting blades (not shown) that are mounted within the head in a known manner. The head itself is mounted conventionally so that it can be raised and lowered within the housing relative to a board supporting table 18. A crank (not shown in FIG. 1, but see crank C in FIG. 25) may be provided for raising and lowering the cutting head. The carriage system of the planer and various other components utilized to moveably mount and operate the cutting head within the casing should be understood to persons skilled in the art and do not comprise elements of the present invention.

It is well known that the task of calibrating machines such as planer P has, to date, been difficult because the cutting head is normally not allowed to be lowered to the table or base surface 18. This means that the machine will never achieve a "zero" thickness cut. Pressing the "zero" or calibration switch on a conventional digital readout will calibrate the machine at some point that is actually greater than zero (i.e. the lowermost height to which the cutting head can be adjusted).

Measurement system 10 overcomes the foregoing problem. The system features an elongate reference element 20, carrying a longitudinal, capacitative or otherwise electrically operable component 21 of the type conventionally used in electronic readout systems. Alternatively, component 21 may operate mechanically, optically or in other known ways with a reader head as described below. As shown further in FIGS. 2 and 3, component 21 is received and held within a longitudinal channel 22 in element 20. A linear scale 24, marked in any desired increments (e.g. sixteenths, eighths, quarters, halves, and whole inches) is mounted on component 21. The scale may comprise a tape that is applied adhesively over electrical component 21.

Reference element 20 is mounted to move longitudinally, upwardly and downwardly along the exterior front face of casing 12. The reference element is specifically mounted to the casing by means of an elongate metal (or plastic) mounting bracket 26 that is fastened to the front face 28 of casing 12, such that the bracket extends generally vertically along the casing. The inner surface of bracket 26 may carry a pair of adhesive foam tape strips 30 and 32 (FIGS. 2 and 3) for securing the bracket to front face of the casing. Screw accommodating holes 34 and 36 may also be utilized for attaching the bracket to the casing.

Figure 2:
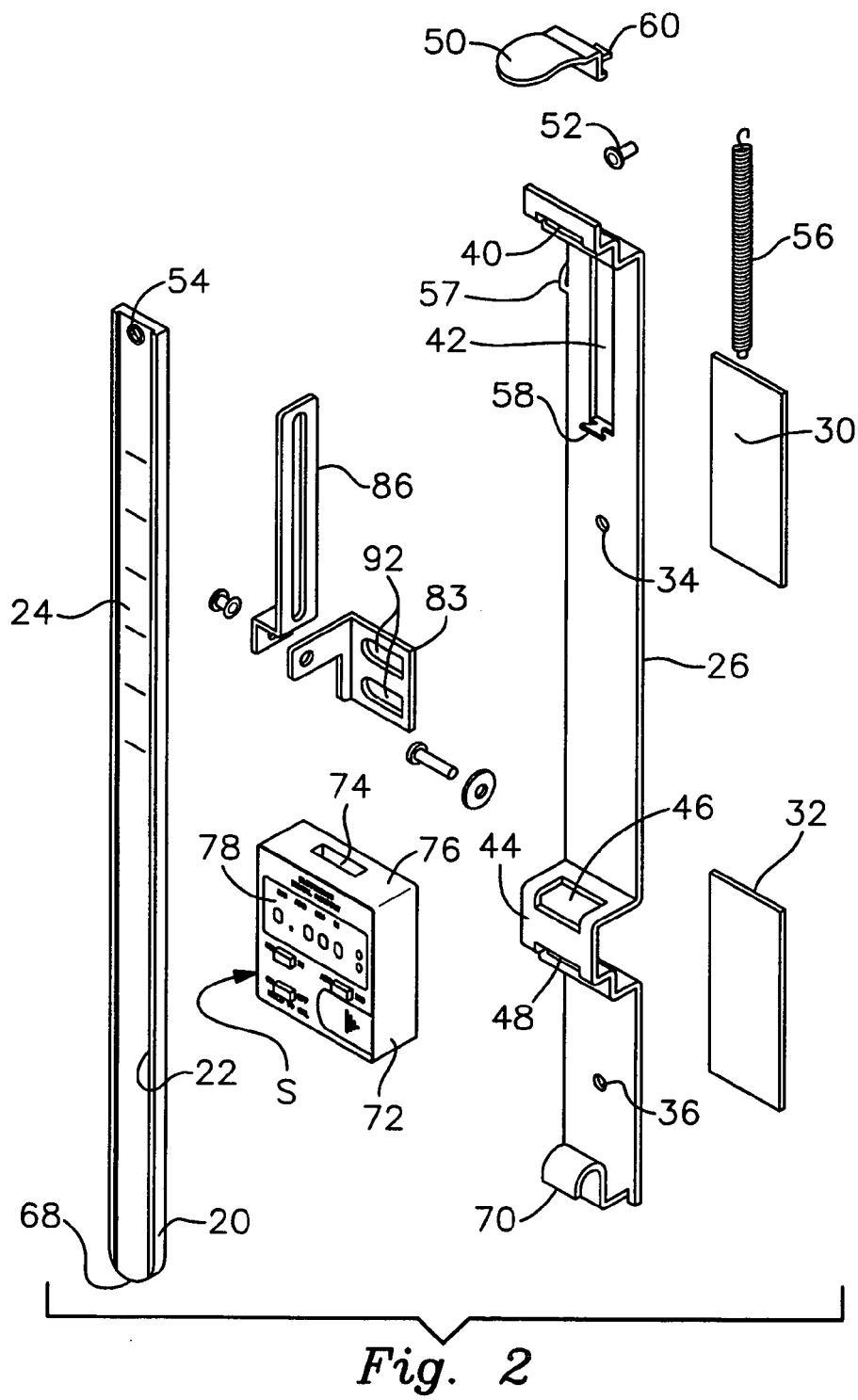
FIG. 2 is an exploded view of the digital measurement system.
Figure 3:
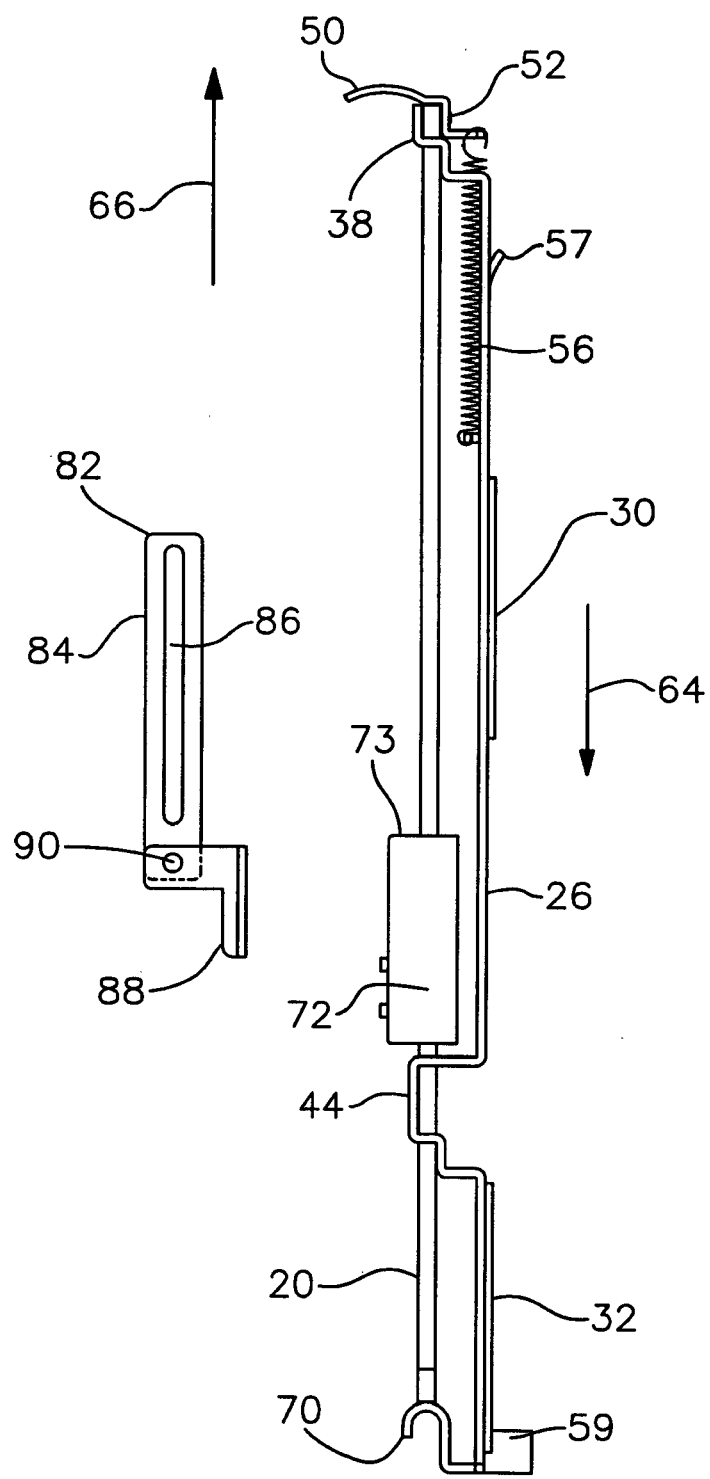
FIG. 3 is a side elevational view of the measurement system.

The upper end of the bracket includes an integral stepped portion 38, FIGS. 1–3, having a transverse slot 40. A spring accommodating recess 42 is formed below stepped portion 38. Somewhere below the midpoint of bracket 26, the bracket includes an integral forward projection 44 that has aligned upper and lower slots 46 and 48. These slots are, in turn, aligned with upper slot 40 for receiving elongate element 20 in the manner best shown in FIG. 3. Bracket 26 carries an upper alignment tab 57 and a lower alignment tab 59, which are employed in the manner described below to fit and align the bracket with the casing 12 of machine P.

A lift handle 50 is secured to the upper end of reference element 20 and more particularly is fastened to the reference element by means of a screw 52 that interengages a hole, not shown, in lift handle 50 and an aligned hole 54 in reference element 20.

A helical spring 56 interconnects a tab 58 at the lower end of channel 42 and a corresponding tab 60 carried by lift handle 50. When the reference element 20 is slidably received within the corresponding slots in bracket 26, spring 56 pulls lift handle 50 and, thereby, reference element 20 downwardly within bracket 26 as indicated by arrow 64. The spring also allows lift handle 50 and reference element 20 to be pulled upwardly within the bracket as indicated by arrow 66. When lift handle 50 is released, the spring tension pulls the reference element 20 downwardly within the bracket such that the lower, convex end 68 of reference element 20 engages a convex stop 70 carried at the lower end of bracket 26. Convex stop 70 is configured to extend upwardly from the lower end of bracket 26 such that its upper surface is substantially level or even with the horizontal planer surface of table 18.

In other embodiments of the invention, the stop may have alternative shapes. In some versions the stop may comprise a component that is separate and distinct from the bracket. The stop may itself comprise a hexbolt or other component that is vertically adjustably mounted to the machine casing separate from the bracket 26. In all cases, the stop should be positionable generally even with the horizontal surface of the table or other base. The particular shape and construction of the stop may be adjusted to fit the particular machine involved.

A conventional digital readout 72 is secured to cutting head 14 and is mounted to slide upon and operate in conjunction with reference element 20. The manner of slidably mounting a readout device on a complementary reference element such that moving the readout device along the reference element displays corresponding measurements is well known and does not comprise a feature of this invention. Specifically, readout device 72 includes a vertically disposed channel 74, FIG. 2, that slidably receives reference element 20. Readout device 72 includes a reader head that cooperates electrically mechanically, optically or otherwise with the conductive component 21 of reference element 20 in a known manner such readouts are provided by various manufacturers such as Motutoyo. The readout is programmed and constructed employing electronic components that will be known to persons skilled in the art. The upper surface 76 of readout device 72 may serve a cursor which is aligned with corresponding linear indicia on scale 24 to provide visual measurements that can be read from the linear scale. Readout device 72 also includes a digital display 78, which typically comprises an LCD or similar display. Various buttons or switches S are provided to calibrate and operate the reader and display in the manner described below.

Readout device 72 is mounted to cutting head 14 so that the readout device travels upwardly and downwardly along the reference element 20 as the cutting head is respectively raised and lowered. More particularly, the readout device is attached to the cutting head by means of a mount 82 that includes an elongate lever arm 84, having a central slot 86 and a readout mounting bracket 88 that is attached to lever 84 by a screw or rivet 90. Bracket 88 itself includes horizontal slots 92 that allow the readout mounting bracket to be secured by means of appropriate bolts to the cutting head. Normally, these are the same screws or bolts that attach a conventional pointer or cursor to the cutting head.

Measurement system 10 is mounted to planer P in the following manner. Initially cutting head 14 is adjusted upwardly, by means of crank handle C (FIG. 28), so that there is at least a predetermined (e.g. three inch) opening between the cutting head 14 and table surface 18 (FIG. 1). For optimum accuracy the side cover of casing 12 should be secured tightly to the base B of planer P. Any mounting screws should be tightened and if necessary, a small amount of epoxy adhesive may be applied between the side cover and base B to present movement of the casing.

The standard scale cursor is then removed from the planer. The holes that remain in the cutter head are used to receive screws or bolts 90 that attach the readout device to the cutter head in the manner described previously. The side cover of the casing is then cleaned of dirt and grease.

Figure 4:
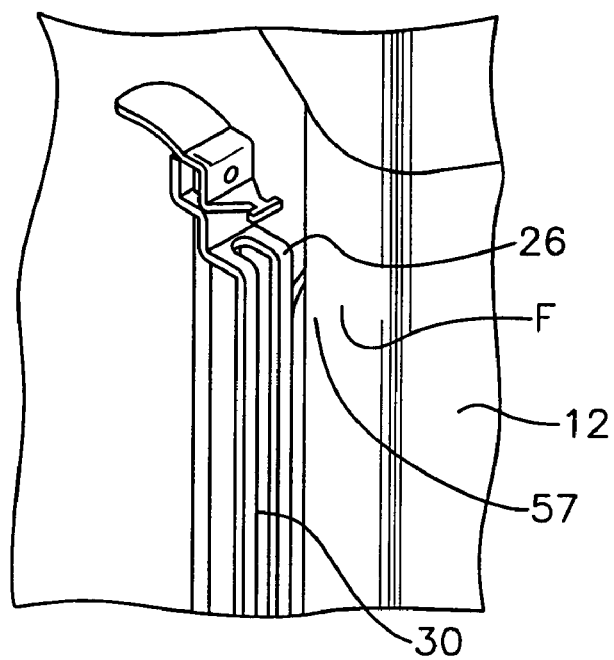
FIG. 4 is a perspective view of the upper end of the measurement system, particularly illustrating how the measurement system is initially engaged with the housing or casing of the machine.
Figure 5:
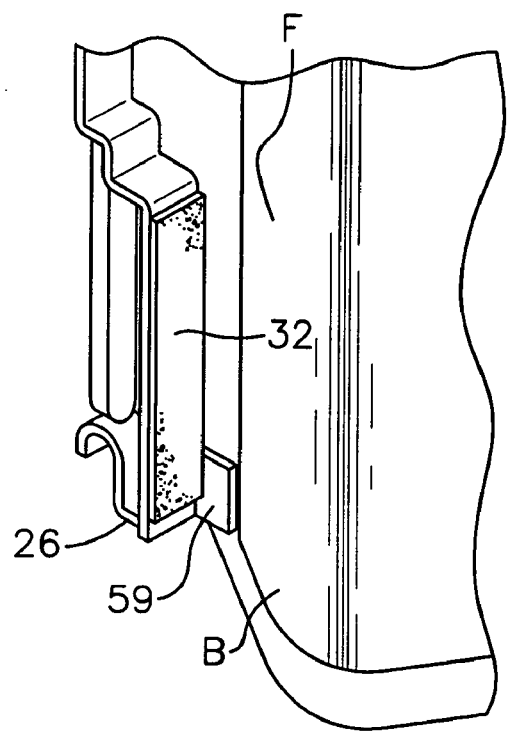
FIG. 5 is a perspective view of the lower end of the measurement system in a position analogous to that shown in FIG. 4.

The mounting bracket 26 and slidably interengaged reference element 20 are mounted to casing 12. The backing is removed from adhesive strips 30 and 32. Bracket 26 is then aligned with the edge of the planer casing 12 in the manner shown in FIGS. 4 and 5. The bracket is held at a slight angle to the front of the casing so that the adhesive strips do not contact the casing until the mounting bracket is in its correct position. The upper and lower alignment tabs 57 and 59 are used to interengage the mounting bracket with the edge of the machine casing and to provide proper alignment between these components. The bracket is pivoted about the mounting tabs such that the adhesive strips 30 and 32 press firmly against the front face F of casing 12. While keeping the alignment tabs contacting the base B and side cover of casing 12, the mounting bracket is pushed firmly against the front face F of the casing. This secures mounting bracket 26 and slidably attached reference element 20 to the fixed casing.

Next, digital readout 72 is attached to cutting head 14. To accomplish this, readout mount 82 is first fastened to the cutting head using the screws 90 previously used to mount the pointer or cursor to the cutting head. See FIG. 6. Screws 90 are loosened so that mount 82 is moveable side to side as indicated by double-headed arrow 100. Mounting screw 102, which secures digital readout 72 to arm 84 of mount 82, is loosened to disengage the readout from mounting bracket 82. The readout is then operably (slidably) interengaged with reference element 20 by inserting the reference element through slot 74 of readout 72. The readout is moved along the reference element to a position adjacent the slotted lever arm 84 of mount 82. Lever arm 84 is rotated so that mounting screw 102 can be assembled through slot 86 (see FIGS. 2 and 3) and engaged with readout 72. The screw is lightly tightened and the cursor screws 90 are fully tightened to attach the mounting bracket 82 securely to the front of the planer cutting head. Readout mounting screw 102 is then loosened again.

Cutting head 14 is next adjusted to a low position. If the planer has a preset depth stop, the stop is set at one of the lowest positions (e.g. one-quarter inch or one-half inch) and the cutter head 14 is lowered until it engages the stop. If the machine does not include preset depth stops, the head is lowered as far as possible, which should be to a height of about one-eighth inch. As indicated in FIG. 7, readout 72 is slid longitudinally downwardly along reference element 20 as indicated by arrow 64. Using the top edge 73 of readout 72 as a pointer, the readout is aligned with a corresponding reference marking on steel scale 26. If the planer cutting head has been lowered to a preset position of, for example, one-half inch, the readout is correspondingly set so that its upper edge 76 is aligned with the one-half inch marking on scale 26. Alternatively, if the cutting head has been lowered as far as possible (i.e. to a height of one-eighth inch) the upper surface 76 of readout 72 is likewise set at a position of one-eighth inch on scale 26. See reference numeral 110 in FIG. 7 referring to this positioning. Mounting bracket lever 84 is then rotated to a position wherein slot 86 is aligned with the mounting hole in the side of the readout. Mounting screw 102 is reinserted through slot 86 and into the hole in the side of the readout. The screw is tightened snugly. Raising and lowering the cutting head 14 thereby causes readout 72 to travel freely upwardly and downwardly along reference element 20 and scale 26. The foregoing procedure permanently affixes readout 72 to cutting head 14 and likewise permanently interengages the readout with reference element 20 and scale 26. Subsequently, the readout does not have to be adjusted relative to these components.

FIG. 8 depicts an alternative positioning or configuration for the readout and its mounting bracket. Lever arm 84 may be arranged to extend upwardly or downwardly from angle bracket 88, depending upon the model of the machine with which the measurement system is used.

Figure 9:
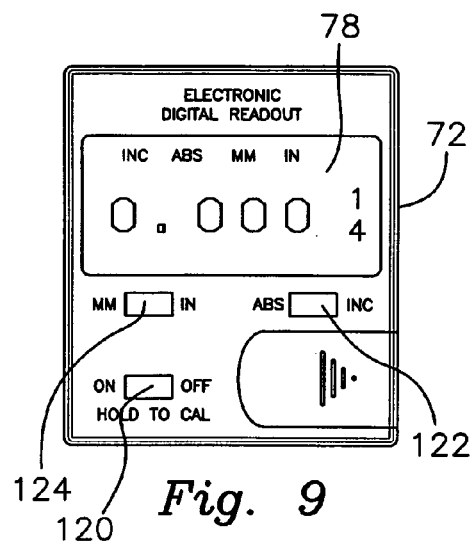
FIG. 9 is a front elevational view of a preferred digital readout utilized in the measurement system.

Electronic readout 72 employs various known components including a digital reader and a digital display that is responsive to the reader. Readout 72 also utilizes a number of switches or buttons which operate, calibrate and change modes of the readout. For example, as shown in FIG. 9, readout 72 includes an on-off switch 120. Momentarily pressing button 120 respectively activates and deactivates the readout. The device may be programmed so that engaging the on-off switch for a predetermined length of time (i.e. three seconds or more) when the readout is either previously deactivated or in an absolute operating mode (described below) resets the "absolute" measurement reading on display 78 to "zero" ("0.000"). This is an important feature in calibrating the readout, as is described more fully below.

Readout 72 includes a toggle switch or button 122 that alternates the display between absolute ("ABS") and incremental ("INC") modes. The absolute display mode indicates the relative distance that readout 72 has traveled along reference element 20 from the reference position at which the device is calibrated (i.e. the position where the absolute measurement of display 78 is "zero"). The incremental mode reflects the distance that the readout has traveled along the reference element from any selected position. Switch 122 is engaged to toggle readout 72 between absolute and incremental modes. Each time the absolute mode is actuated, a reading appears on display 73 which indicates the distance that the reader has traveled from the absolute zero reference point. Each time the incremental mode is toggled, a reading of "zero" appears. Subsequent movement of the readout, while remaining in the incremental mode, provides for incremental distance measurements from that point.

A toggle switch 124 is used to alternate display 78 between inches and metric measurements. The four readout modes ("INC" for incremental, "ABS" for absolute, "IN" for inches, and "MM" for millimeters or metric) are reflected in the upper portion of display 78 above the digital numerals. Various other locations, abbreviations and variations of modes may be employed within the scope of the invention.

Figure 10:
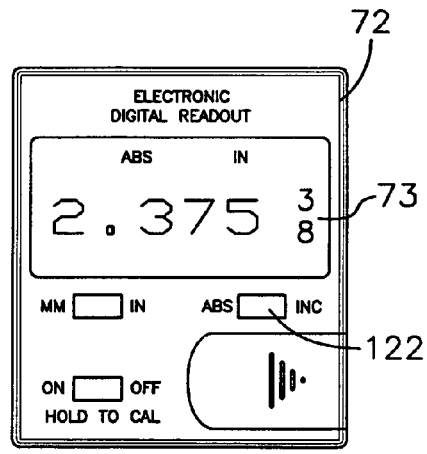
FIG. 10 is a front elevational view of the readout specifically illustrating decimal and fractional measurements displayed in the absolute and inches modes.

Display 78 is typically provides measurements decimally and is accurate to the one-thousandth of an inch. As shown in FIG. 10, fractional equivalent measurement 73 (e.g. one-thirty second, one-sixteenth, one-eighth, one-quarter, etc.) may also be depicted adjacent to the decimal display. The fractional and decimal equivalents are described more fully below. Fractions are provided for the convenience of persons who prefer fractional measurements. Either the decimal measurement, e.g. 0.375, or its fractional equivalent, ⅜, may be viewed in combination with the whole number displayed to the left of the decimal point.

Figure 11:
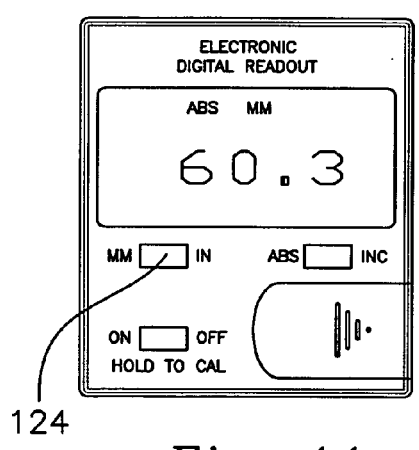
FIG. 11 is a front elevational view of the readout with measurements displayed in the absolute and metric modes.
Figure 12:
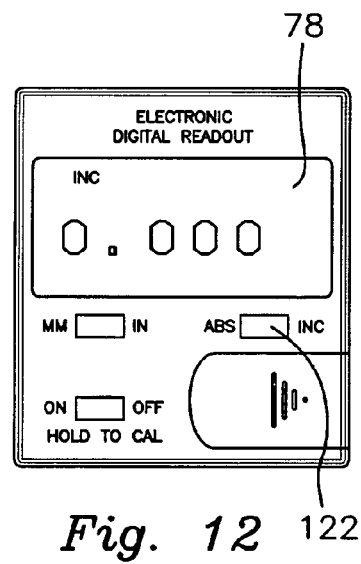
FIG. 12 is a front elevational view of the readout in an incremental mode, with the display reset to a measurement of "zero"

FIGS. 10–12 more specifically depict the various modes in which the display 78 of readout 72 may be operated. For example, in FIG. 10, button 122 is operated to toggle the device into the ABS and INC modes and button 124 is similarly operated to select the "inches", or IN mode. At a position where readout 72 has moved 2⅜ inches from the reference point where the readout is calibrated at absolute zero, the numbers shown in display 78 appear. Specifically, in this example, the decimally based measurement "2.375" is displayed and the fractional equivalent to 0.375, "⅜", is also displayed. By toggling button 124, the display switches into the metric mode "MM", which displays a reading of 60.3 mm.

FIGS. 10 and 12 similarly depict the display results of toggling between the ABS and INC modes. Assuming that the readout device has been properly calibrated, in the manner described more fully below, readout 72 displays, in the absolute mode, the actual distance from the upper surface of the supporting table 18 to the tips of the blades in the cutting head. For example, in FIG. 10, that measured distance is two and three-eighths inches. The readout may then be alternated into an incremental mode by pressing toggle switch 122. This resets the display 78 to zero in either the inches or metric mode, FIG. 12. If switch 122 is toggled again, without moving the readout along the reference element, the display 78 returns to the absolute mode shown in FIG. 10. In each case, the pertinent mode or modes are revealed in the display using the designations ABS, INC, IN, and MM.

Pressing button 120 momentarily activates and deactivates the readout device. As previously indicated, if the readout device is in the absolute measuring mode (or deactivated altogether) and button 120 is pushed and held for a predetermined period of time (e.g. three seconds or some other period), the absolute reading becomes "zero". This operation is utilized to calibrate the readout in the manner described more fully below. Subsequently, the readout can be turned on and off by momentary actuation as previously described. In each case, the calibrated null or zero position of the readout is remembered as long as the button is not subsequently pressed for longer than the predetermined time period. In this manner, absolute readings may be measured and stored even if the readout is turned off and subsequently turned back on after initial calibration is performed.

Figure 13:
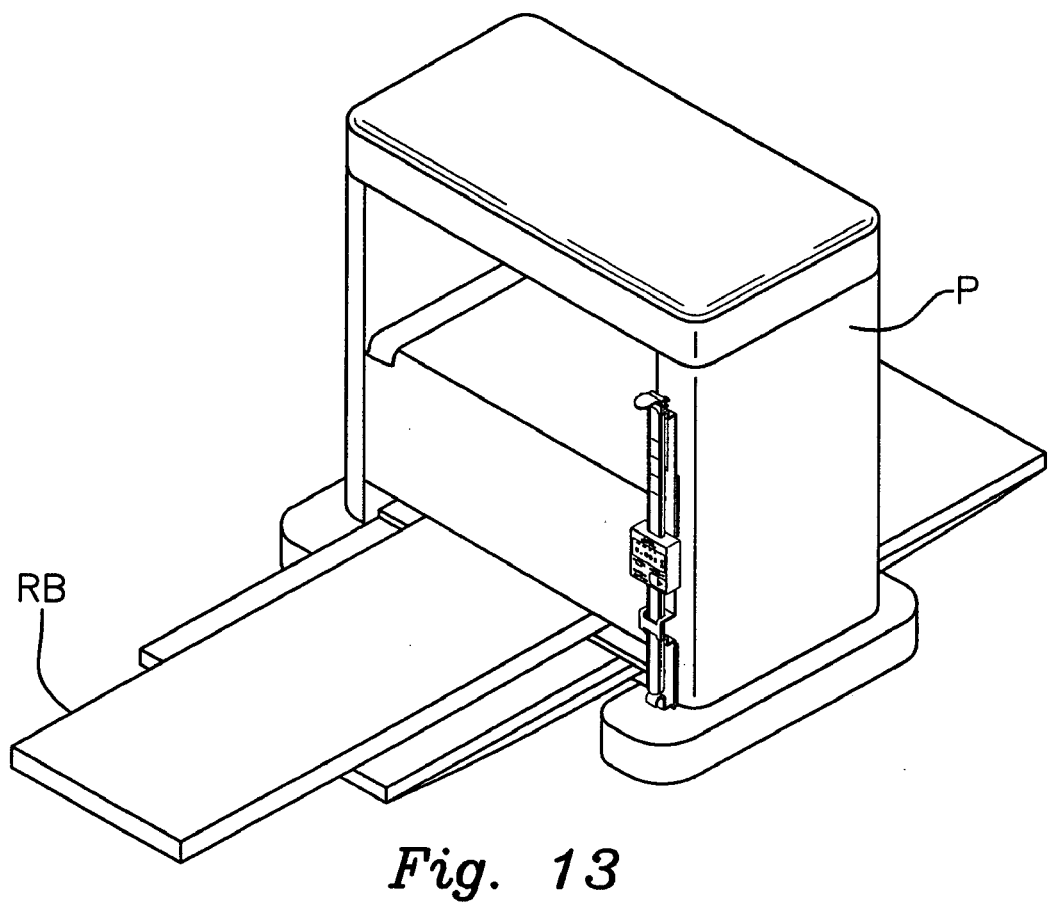
FIG. 13 is a perspective view of the machine being operated to cut a layer from a representative or reference board, such that the upper surface is generally smooth.

Measurement system 10 is calibrated in the following manner. Initially, as shown in FIG. 13, a piece of flat reference board RB is run through the planer until material is removed from the top of the board. After a desired amount of material has been cut from the board, the planer P is turned off and unplugged. The height of the cutting head is set and a lock is engaged if available.

Figure 14:
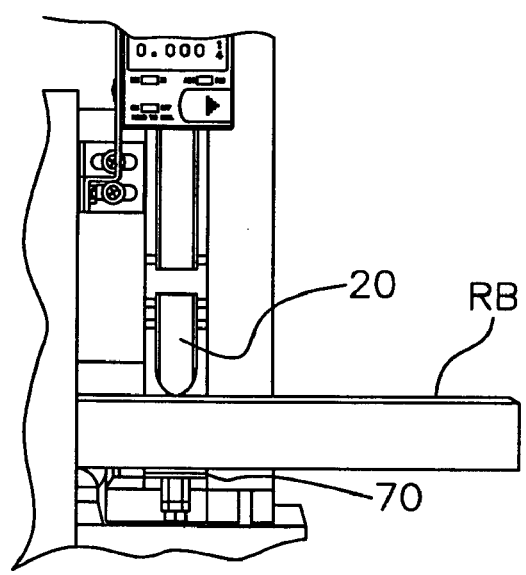
FIG. 14 is a front elevational view of the reference board being placed between the supporting table of the machine and the lower end of the reference element so that the measurement system may be properly calibrated.

Readout 72 is activated by pressing button 120 and button 122 is engaged, as needed, to place the readout into the absolute mode. The user grasps lift handle 50 attached to reference element 20 and slides the reference element and attached scale upwardly against the tension of spring 56 until a sufficiently wide gap is created to fit the reference board RB between the lower end of reference element 20 and rounded stop 70, which is even with table 18 (see FIG. 14). Preferably, the first two or three inches at the end of the reference board are not used as such regions may contain material that will adversely affect the calibration. Handle 50 is released and spring 56 urges the lower end 68 of element 20 to engage the upper section of board RB.

Figure 15:
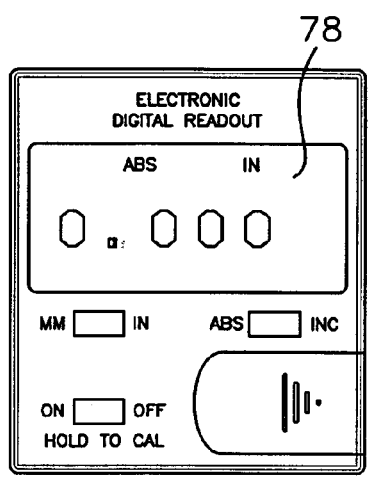
FIG. 15 is a front elevational view of the readout with the display initially activated in the ABS mode with a measurement of "zero" for calibration of the measurement system.

The user presses switch 120 and holds that switch for the predetermined time period (e.g. three seconds) until the reading on display 78 is "0.000" in the ABS mode. See FIG. 15. This represents the calibrated or reference position at which the tips of the cutting blades would be touching the board-supporting surface of the machine. To complete the calibration procedure, board RB is removed from between the lower end of reference element 20 and supporting stop 70. The spring 56 returns the scale to its fully lowered position wherein the convex lower end of the reference element directly engages stop 70. The readout displays a number in the ABS mode indicating the relative distance the readout has traveled along the reference element as the reference element slides into engagement with stop 70. This measurement is the exact thickness of reference board RB. As a result, the readout is properly calibrated and will thereafter provide accurately calibrated measurements at any position to which it is adjusted. The readout will maintain its proper calibration when deactivated and reactivated, and will not require recalibration unless the power source (battery) of the readout is removed or expires; or unless the planer blades are changed or undergo considerable wear.

Figure 16:
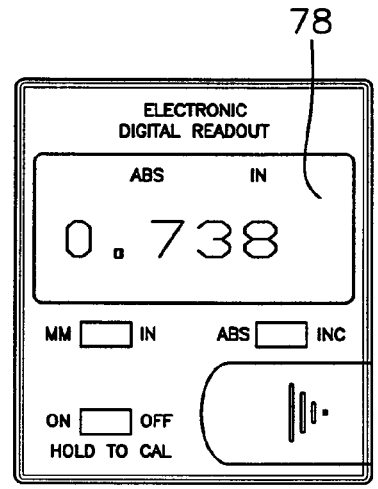
FIG. 16 is a front elevational view of the readout after the reference board has been removed at the reference element returns to its lowered condition in engagement with the stop.

Following calibration of planer P, the planer may be used in a normal manner. Each time the cutting head is raised or lowered, the display will indicate the precise height of the cutting head and, likewise, the thickness to which a piece of wood will be planed. For example, if after reference board RB is removed from the scale, the lower end of the scale drops such that a reading of 0.738 inches is displayed in the readout, FIG. 16, the user knows that, with the readout in the ABS mode, the height of the cutting head is 0.738 inches and any piece of wood cut with the head at that height will have a finished thickness of 0.738 inches. If the cutting head is subsequently raised or lowered, the adjusted cutting thickness will be indicated automatically and instantaneously on the display in the ABS mode.

Figure 17:
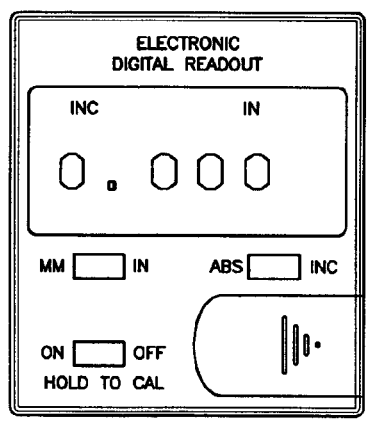
FIG. 17 is a front elevational view of the readout after the "incremental" mode switch has been activated; this reading is used to measure the thickness of a board or subsequent adjustment of the cutting head.
Figure 18:
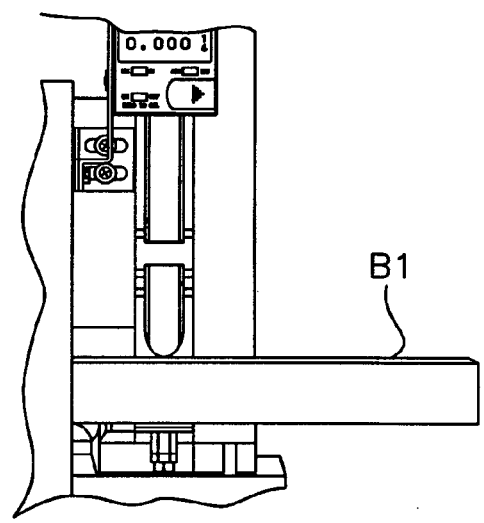
FIG. 18 is a front elevational view of a board being placed between the supporting table and the lower end of the reference element so that the thickness of the board may be measured.
Figure 19:
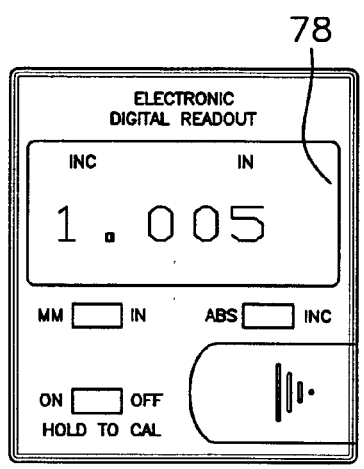
FIG. 19 is a front elevational view of the readout indicating the thickness of the board on the incremental display mode.

A number of other measuring applications may be implemented using digital measurement system 10. In particular, the incremental mode (INC) may be selected to measure the thickness of any board or component being worked upon. First, the INC/ABS button is toggled to select the incremental mode, FIG. 17. The reading is either 0.00 mm or 0.000 inches depending upon the units of measurement selected. Lift handle 50 is grasped and the reference element is raised so that the board B1 to be measured can be placed between the lower end of the reference element and lip 70. See FIG. 18. The thickness of board B1 is then indicated in display 78. For example, in FIG. 19, a board thickness of 1.005 inches is displayed in the incremental mode. The convex lower end of element 20 allows reference element to snugly engage rough or uneven boards. The system thus compensates for irregular boards that would otherwise disrupt the measurements.

Figure 20:
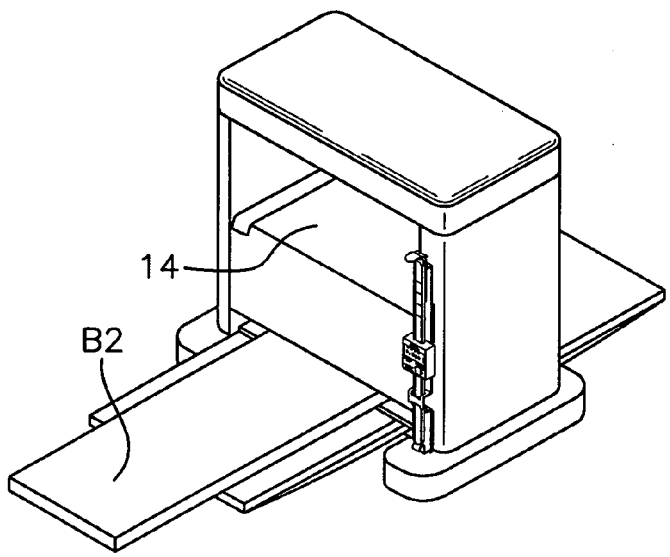
FIG. 20 is a perspective view of a board being planed by the machine immediately prior to the removal of a precise predetermined amount of material from the board.
Figure 21:
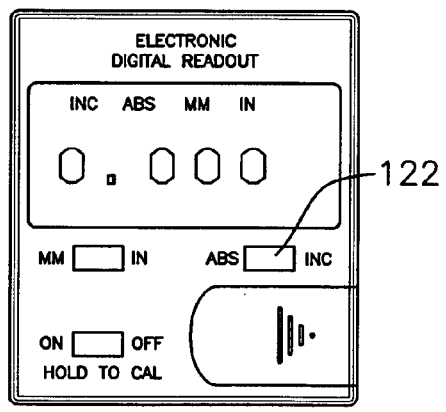
FIG. 21 is a front elevational view of the readout with the "incremental" button set to zero such that a precise amount of material may be removed from the board on a subsequent pass.
Figure 22:
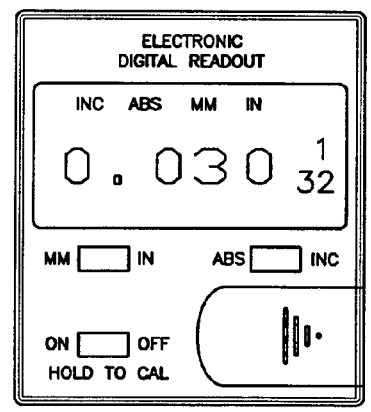
FIG. 22 is a front elevational view of the readout in the "incremental" mode after the cutting head has been lowered a precise amount to remove that amount of material from the board.

System 10 also allows the user to remove a precise amount of material on a final pass-through planer P. First board B is planed to a desired degree as in FIG. 20. When the user is ready to run board B2 through a final pass of the planer, but only a precise amount of wood is to be removed, the user presses the ABS/INC button 122, FIG. 1, until the incremental mode INC is selected FIG. 21. The user then removes the previously engaged lock of cutting head 14 and lowers the cutting head until the digital readout shows the amount of material the user wishes to remove on the final pass through the planer. When this amount is reached, e.g. 0.030 or one-thirty second inch in FIG. 22 the cutter head is locked and the final planing pass is made. The reading on the display (0.030 inches) will be the precise thickness that has been removed on the final pass. During this entire procedure, the calibration and accuracy of the readout are perfectly maintained.

Figure 23:
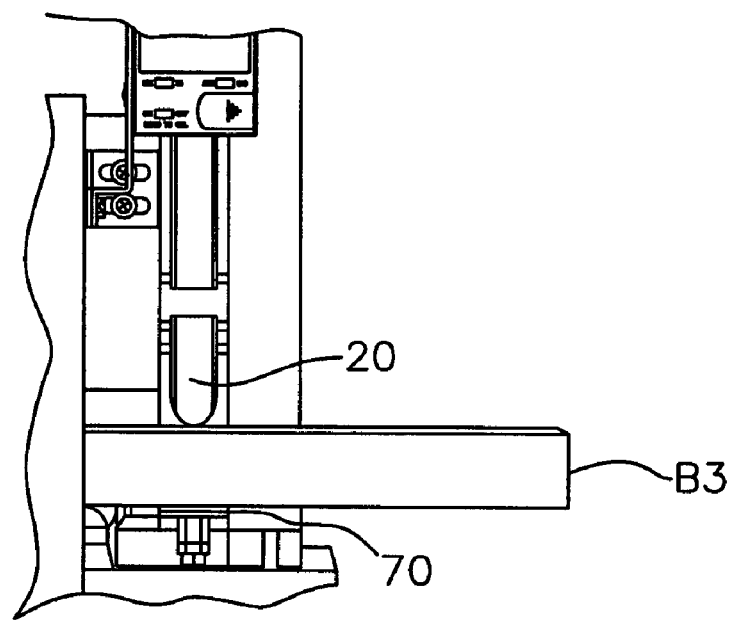
FIG. 23 is a front elevational view of a board of unknown thickness being inserted between the lower end of the reference element and the supporting table.
Figure 24:
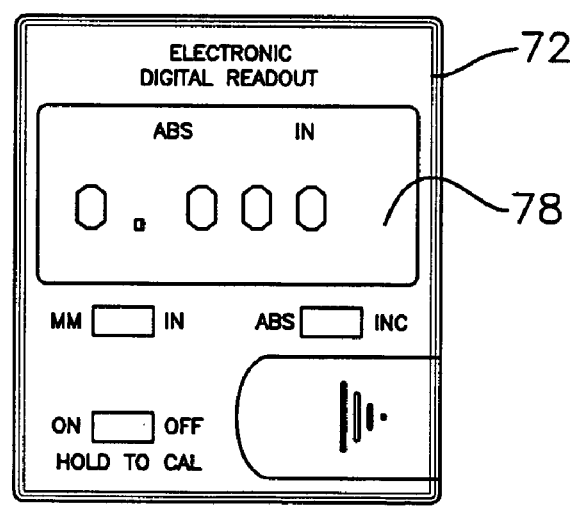
FIG. 24 is a front elevational view of the readout with a display indicating a "zero" measurement in the absolute mode.

In still another application, the cutter head may be set to the height of an unknown board thickness. Initially, the readout is left in the ABS display mode. The reference element 20 is raised in the foregoing manner, and as further shown in FIG. 23 and board B3 is inserted between the lower end of the reference element 20 and the stop 70. The cutter head is then raised or lowered using the crank until the reading in the absolute mode is 0.000, FIG. 24. After the board is removed, the cutter head is set at exactly the height that will allow it to skim the top surface of the wood of board B3 as that board is fed through the planer. Alternatively, board B3 may be left under the scale and when the user reaches this "0.000" ABS position, he or she may continue to crank the cutter head downwardly until a small desired value is displayed. That value would reflect the amount of material that would then be removed from the particular board if it is subsequently placed in the planer.

Figure 25:
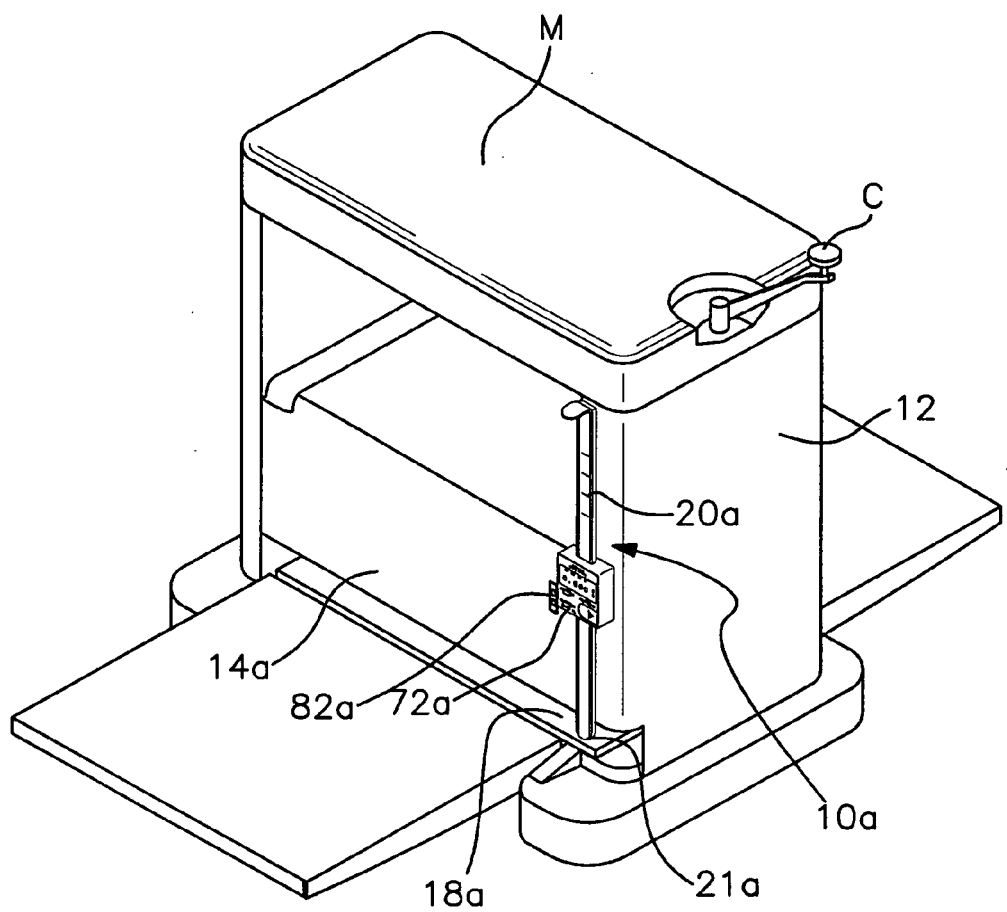
FIG. 25 is a perspective view of a machine incorporating a permanently installed measurement system according to this invention.

In an alternative embodiment, measuring system 10a, FIG. 25 may be mounted permanently on machine M. In this version, a reference element 20a bearing a scale similar to the prior version is slidably mounted to casing 12. Readout 72a is permanently fastened to cutting head 14a by a bracket 82a. The lower end of reference element 20a includes a convex tip 21a that engages the upper surface of table 18a. Once again, a spring is preferably incorporated between the casing 12 and reference element 20a to urge the reference element downwardly into engagement with the upper surface of table 18a. This measurement system operates in a manner analogously to the previously described system.

Figure 26:
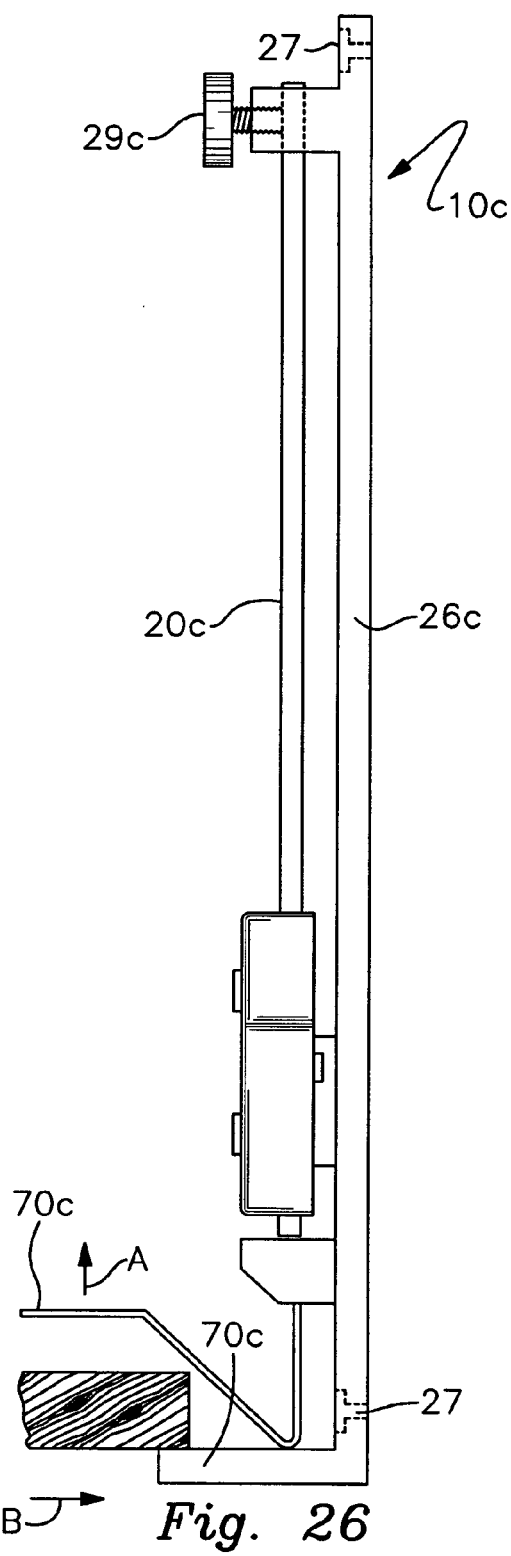
FIGS. 26 and 27 are side and front elevational views respectively of an alternative measurement system according to this invention.
Figure 27:
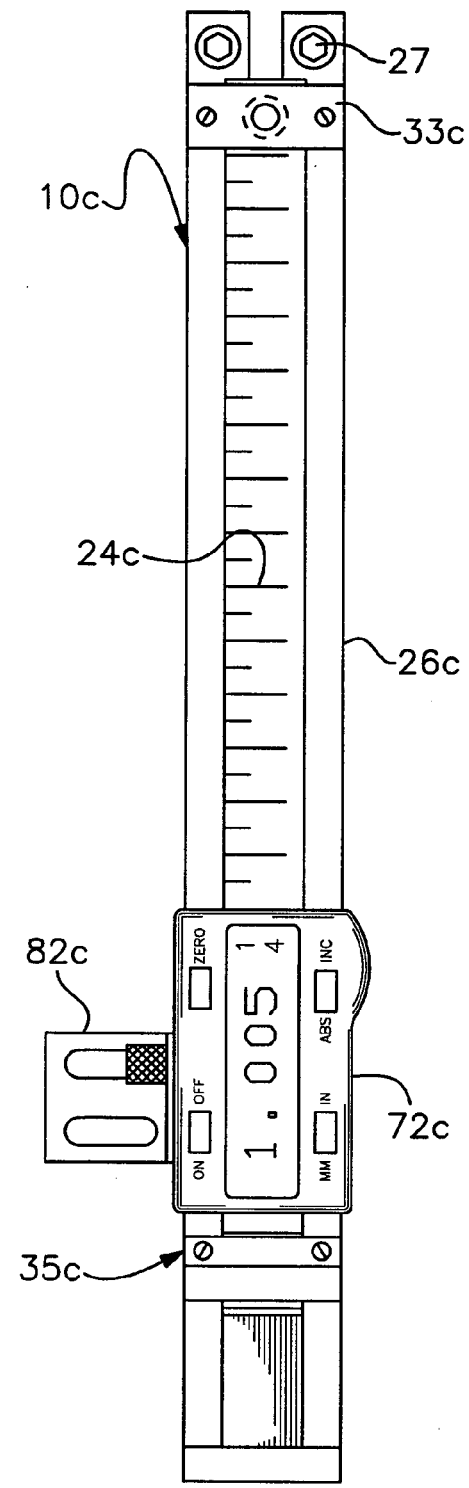

FIGS. 26 and 27 disclose a measurement system 10c that may be either retrofit onto a machine or incorporated permanently into the machine. Measurement system 10c includes a bracket 26c that may be formed either integrally with the casing of the machine, or which alternatively may be attached to the casing such as by screws engaged with screw holes 27. An elongate reference element 20c carries a scale 24c. The reference element is mounted for moving upwardly and downwardly through bracket 26c. The reference element may be held in place relative to the bracket 26 by a set screw or knob 29c that is received by a hole 31c in a locking bridge 33c of bracket 26c. The lower end of reference element 20c includes or carries a lifting tab 70c. The reference element extends downwardly from locking knob 29c through a retainer block assembly 35c and terminates at a stop 70c.

A digital readout 72c having structure and functions analogous to those previously described, is slidably mounted onto reference element 20c. Once again, the reference element and the digital readout are comprised of complementary components which cooperate so that the display provides measurements of relative movement of the readout 72c along element 20c. The construction of these components will again be known to persons skilled in the art. A mounting bracket 82c is utilized to fasten readout 72c to the cutting head in the previously described manner.

Figure 28:
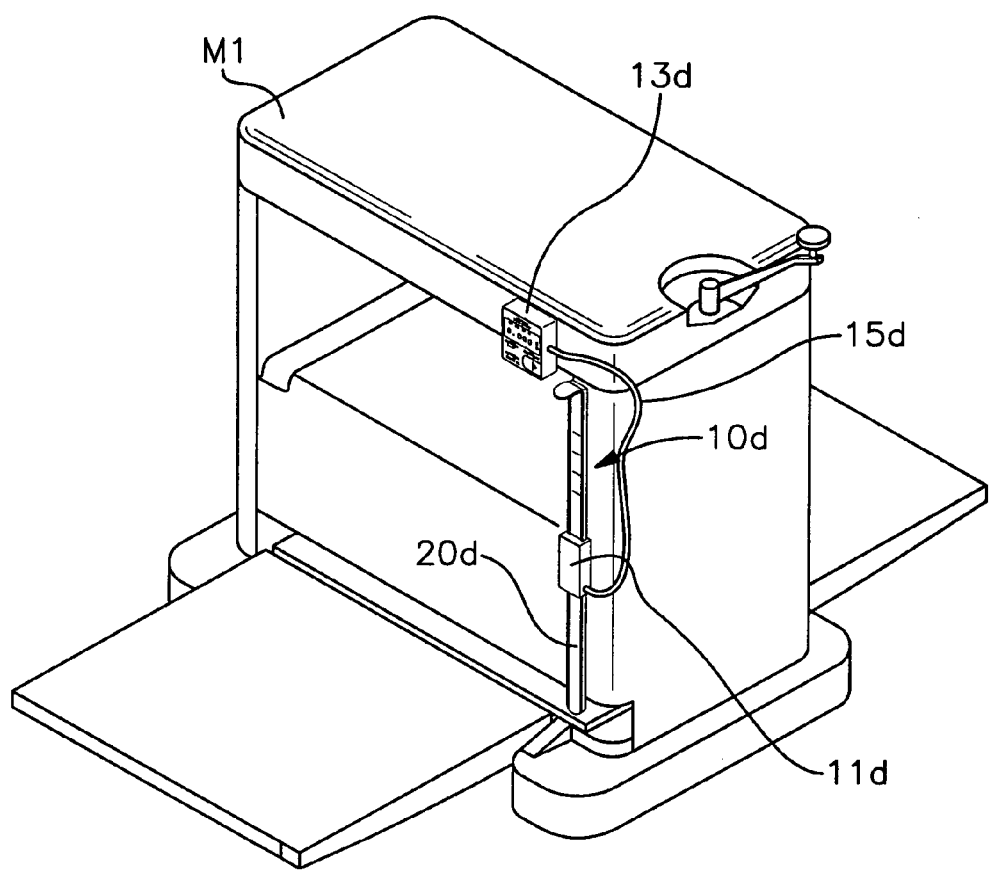
FIG. 28 is a perspective view of an alternative measurement system wherein the display is connected to the reader by a cable such that the display may be positioned at an alternative location on the machine.
Figure 29:
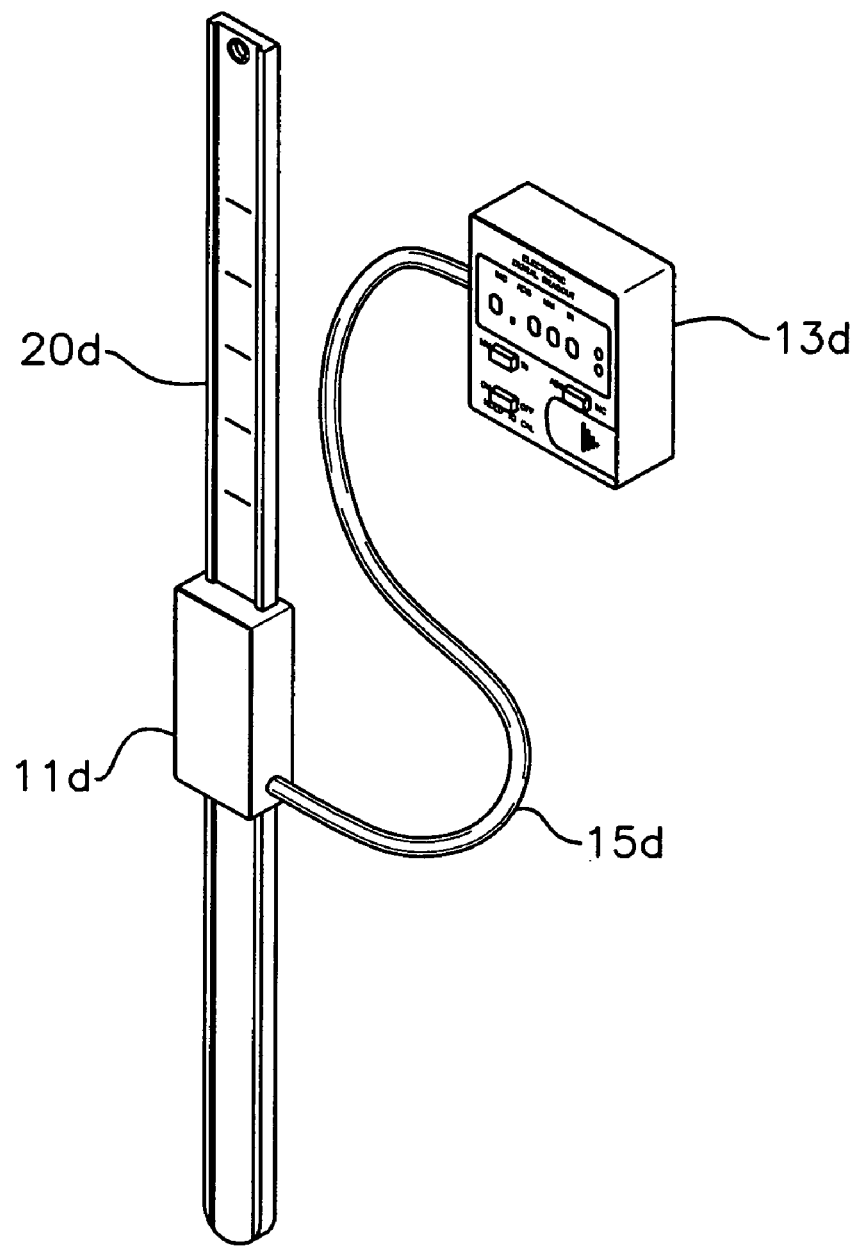
FIG. 29 is a perspective view of the separated reader and display of FIG. 28.
Figure 32:
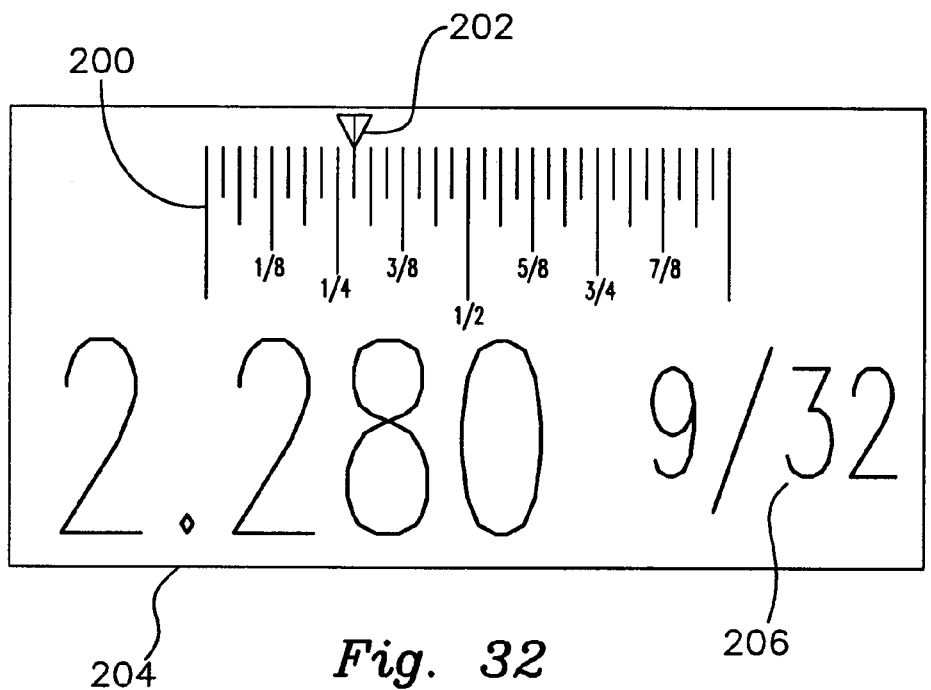
FIG. 32 is an elevational view of an alternative readout display wherein a linear scale and cursor are displayed along with equivalent decimal and fractional measurements.

In the version shown in FIGS. 28 and 29, readout device 10d comprises a separate reader 11d and display unit 13d. The display unit is attached to the reader by means of a cable 15d. This permits the reader to be positioned conveniently at an upper location of the machine M1. The reader 11d slides upwardly and downwardly along a reference element 20d. Buttons for operating the display unit 13d are located on the display unit and operated analogously to the previously described embodiment. Otherwise, this version is constructed and operates analogously to the previously described versions of the invention.

The digital measurement system may employ a decimal and fractionally equivalent based readout as previously described and as set forth below. This feature is provided for the convenience of users who are more comfortable with or would prefer to view fractional measurements in the digital readout. As depicted, for example, in FIGS. 9 and 10, the readout includes a display that provides measurements in both decimal and fractional formats. Measurements of relative movement between the reader head and the reference element (steel scale) are typically made according to a predetermined decimal resolution. This is typically measured in thousandths of an inch, i.e. 0.001. The readout can display decimals according to any desired resolution up to the measurement resolution of the readout. In some cases this is 0.001. Alternatively, a decimal display resolution of 0.005 may be employed.

The readout is provided with standard circuitry for converting the measurements within discrete predetermined decimal ranges to corresponding fractional measurements. These discrete decimal ranges will encompass values slightly above and slightly below the equivalent fractions. The readout displays decimal measurements only when the measurement is within a predetermined decimal range slightly above and slightly below an equivalent fraction. Within that range, the fractional equivalent is displayed. When the measurement is outside the range, the fractional equivalent disappears. Inasmuch as whole numbers are depicted with the decimal measurements, such whole numbers do not have to be repeated with the fractional equivalents; only the fractions themselves appear and reference may be made to the whole number accompanying the displayed decimal value.

The decimal ranges within which measurements are converted to and displayed in fractional equivalents can vary in any predetermined amount according to this invention. However, it is critical that these ranges be less than the fractional display resolution. Otherwise, fractions will be displayed continuously and less than optimally accurate measurements will result.

In one version of the system, the measuring device (and decimal display) resolution is 0.005 inches; the fractional display resolution is one-thirty second inch and the predetermined decimal range is 0.005, with a fractional display tolerance of 0.0025 below and above the precise fractional equivalent. This means that a particular fraction is displayed when the actual decimal measurement is within a range extending from 0.0025 below to 0.0025 above the decimal equivalent at that fraction. As the measuring system is moved from 1.015 inches to 1.075 inches, for example, the displayed measurements would progressively appear on the readout as indicated in the chart of FIG. 30. Therein, the fraction "1/32" (i.e. decimal equivalent 0.031) does not appear until the reading "1.030" appears on the display. By the same token the fraction "1/32" would disappear prior to the succeeding decimal reading of "1.035". The decimal equivalent of one-sixteenth inch (0.0625) is within the 0.025 tolerance range of both "1.060" and "1.065". Therefore, the fractional measurement "1/16" would appear on the display at both of these decimal measurements.

In an alternative version, the actual resolution of the measuring device may be greater than the resolution of both the decimal display and fractional display. In such versions, the decimal may displayed according to its selected resolution and the fraction may be displayed within a range based upon the actual resolution of the measuring device.

For example, in the version depicted by the chart of FIG. 31, the measuring device resolution is 0.001", the desired decimal display resolution is 0.005" and the fractional display resolution is 1/32". The predetermined decimal range within which decimal measurements are converted to fractional display equivalents is 0.004 inches, with a tolerance of 0.002 inches below and above the precise fractional equivalent displayed. In this example the corresponding decimal 1.030" first appears on the display at the decimal measurement "1.029". Again, a tolerance of 0.002 applies for the corresponding decimal display. Display of the fraction 1/32" (0.031") also first appears at the decimal measurement 1.029. This fraction is displayed through the measured decimal range (0.004) ending at 1.033. At the same point, the corresponding decimal display is "1.035". Other fractions are displayed in an analogous manner within respective predetermined decimal ranges of 0.004, which range includes the decimal equivalent of the particular fraction at the midpoint of the range.

In still other versions, various visual display formats may be combined. In the embodiment shown in FIG. 31 the digital display includes a linear scale 200 accompanied by a cursor 202, pointing to the precise scalar measurement. The measurement may also be displayed decimally 204 and fractionally 206. As in the prior embodiments, the whole number, e.g. "2", is required only in connection with the decimal format; the fractional and scalar formats refer only to the decimal equivalent. In all versions the discrete decimal ranges, within which the measurements may be converted to and displayed in fractions, may be varied.

In each of the embodiments the readout may serve as a cursor so that measurements may also be conveniently taken directly from scale 24. Such measurements may be used to corroborate the digitally displayed measurement.

Accordingly, the present invention provides the user with a system for quickly and accurately calibrating the digital readouts used with woodworking machines and a host of other tools and applications. The device does not require frequent annoying recalibration. Improved accuracy and a more convenient, user-friendly display are significant advantages which will help persons in a wide variety of measurement applications.

While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A digital measurement system for an apparatus including first and second parts that are positionally adjustable relative to one another, the first part having a base surface and the second part being selectively adjustable toward and away from the base surface, said system comprising:

an elongate reference element mounted for longitudinal movement on the first part such that a first end of said reference element is positionable to be substantially even with the base surface of the first part;

a bracket for attaching to the first part, said reference element being longitudinally slidably moveable within said bracket; and a digital readout device including a digital reader head attachable to the second part, said reader head being operably interengaged with and moveable along said reference element for measuring relative movement of said reader head along said reference element, said readout further including a digital display for indicating a measurement corresponding to the relative movement of said reader head along said reference element.

2. The system of claim 1 in which said reference element and said reader head are moveably mounted to the first and second parts of the apparatus respectively such that said reference element and said reader head are moveable on said apparatus independently of one another.

3. The system of claim 1 in which said bracket includes a stop for engaging said first end of said reference element and limiting movement of said reference element through said bracket in a first direction, said stop being locatable substantially even with the base surface.

4. The system of claim 3 in which said first end of said reference element includes a convex edge.

5. The system of claim 3 in which a second end of said reference element carries a tab for pulling said reference element longitudinally through said bracket such that said first end is spaced apart from said stop, said system for receiving a component of unknown thickness between said stop and said first end of said reference element whereby that component can be measured by said system.

6. The system of claim 3 further including a spring connected between said bracket and said reference element for urging said reference element through said bracket such that said first end of said reference element engages said stop; said spring allowing said reference element to move in a opposite direction through said bracket to disengage said first end of said flexible element from said stop.

7. A calibrated digital measurement system for an apparatus including first and second parts that are positionally adjustable relative to one another, the first part having a base surface and the second part being selectively adjustable toward and away from the base surface, said system comprising:

an elongate reference element mountable on the first part and being moveable relative to the first part, between a first position wherein a first end of said reference element is substantially even with the base surface of the first part and a second position for selectively receiving a calibrating reference component between a first end of said reference element and the base surface level of the first part; and a digital readout device including a digital reader head attachable to the second part, said reader head being operably interengaged with and moveable along said reference element for establishing a calibrated reference position on said reference element when the calibrating reference component is received between said first end of said reference element and the base surface level and measuring relative movement of said reader head along said reference element with respect to the calibrated reference position, said readout further including a digital display for indicating a measurement corresponding to relative movement of said reader head along said reference element with respect to the calibrated reference position.

8. The system of claim 7 in which said reference element includes a linear scale.

9. The system of claim 7 further including a stop that is mountable to the first part of the machine and positionable substantially even with the base surface of the first part.

10. The system of claim 7 further including a bracket for attaching to the first part, said reference element being longitudinally slidably moveable within said bracket.

11. The system of claim 7 in which said reader head includes means for calibrating said reader head at a selected reference position along said reference element.

12. The system of claim 11 in which said readout includes an absolute mode wherein the distance the reader head moves along the reference element from the selected reference position is measured by said reader head and indicated by said display.

13. The system of claim 12 in which said readout includes an incremental mode wherein said reader head and said display are reset to a measurement of "zero" with said reader head at a selected position on said reference element and wherein subsequent movement of said reader head relative to said reference element is measured by said reader head, which measurement is indicated by said display.

14. The system of claim 7 wherein said readout includes display modes that indicate the measured relative movement decimally and fractionally.

15. The system of claim 7 in which said reference element is longitudinally adjusted on said first part to calibrate said digital readout device.

16. The system of claim 7 in which said reference element is movably mountable to the first part such that said reference element is adjustable between said first and second positions without dismounting said reference element from the first part.

17. The system of claim 7 in which said reference element and said reader head are moveably mounted to the first and second parts of the apparatus respectively such that said reference element and said reader head are moveable on said apparatus independently of one another.

* * * * *

UNITED STATES PATENT AND TRADEMARK OFFICE
CERTIFICATE OF CORRECTION

| | | |
|---|---|---|
| PATENT NO. | : 7,207,121 B2 | Page 1 of 1 |
| APPLICATION NO. | : 10/839370 | |
| DATED | : April 24, 2007 | |
| INVENTOR(S) | : Barry Wixey | |

It is certified that error appears in the above-identified patent and that said Letters Patent is hereby corrected as shown below:

On the Title Page

Item (74) Attorney, Agent of Firm: Change "William E. Nooan" to --William E. Noonan--.

Signed and Sealed this
Seventeenth Day of March, 2015

Michelle K. Lee
*Director of the United States Patent and Trademark Office*